United States Patent [19]
Mizuno et al.

[11] Patent Number: 5,193,635
[45] Date of Patent: Mar. 16, 1993

[54] VEHICLE WITH FUEL CELL SYSTEM

[75] Inventors: Yutaka Mizuno; Toshiharu Hanajima; Hisayoshi Matsubara, all of Iwata, Japan

[73] Assignee: Yamaha Hatsudoki Kabushiki Kaisha, Iwata, Japan

[21] Appl. No.: 587,987

[22] Filed: Sep. 21, 1990

[30] Foreign Application Priority Data

Sep. 21, 1989 [JP] Japan .................................. 1-247209

[51] Int. Cl.$^5$ .............................................. B60K 1/04
[52] U.S. Cl. ................... 180/65.3; 180/68.5; 429/19
[58] Field of Search ..................... 180/68.5, 65.1, 65.2, 180/65.3, 65.4, 908, 291, 299; 280/DIG. 5; 429/19, 17, 26, 34

[56] References Cited

U.S. PATENT DOCUMENTS

| | | | |
|---|---|---|---|
| 4,127,701 | 11/1978 | Symons | 429/19 |
| 4,317,497 | 3/1982 | Alt | 180/68.5 |
| 4,449,606 | 5/1984 | Buschbom | 180/299 |
| 4,473,622 | 9/1984 | Chludzinski | 429/19 |
| 4,650,727 | 3/1987 | Vanderborgh | 429/19 |
| 4,930,591 | 6/1990 | Lanius | 280/DIG. 5 |
| 4,933,242 | 6/1990 | Koga | 429/19 |
| 4,997,728 | 3/1991 | Onoda | 429/34 |

OTHER PUBLICATIONS

Electric Vehicle Technology, L. E. Unnewehr and S. A. Nasar, John Wiley & Sons, Publishers, 1982.
Electric and Hybrid Vehicle Progress, SAE Proceedings, P-91, Feb. 23-27, 1981.

*Primary Examiner*—David M. Mitchell
*Attorney, Agent, or Firm*—Ernest A. Beutler

[57] ABSTRACT

A number of embodiments of fuel cell powered wheeled vehicles wherein the fuel cell assembly is positioned contiguous to the center of gravity of the vehicle and inwardly from the wheels for protection and to make a compact assembly. Various vehicle arrangements are shown and in all of them the fuel cell assembly including the fuel cell and a reformer are supported resiliently on the body beneath the seats thereof.

13 Claims, 5 Drawing Sheets

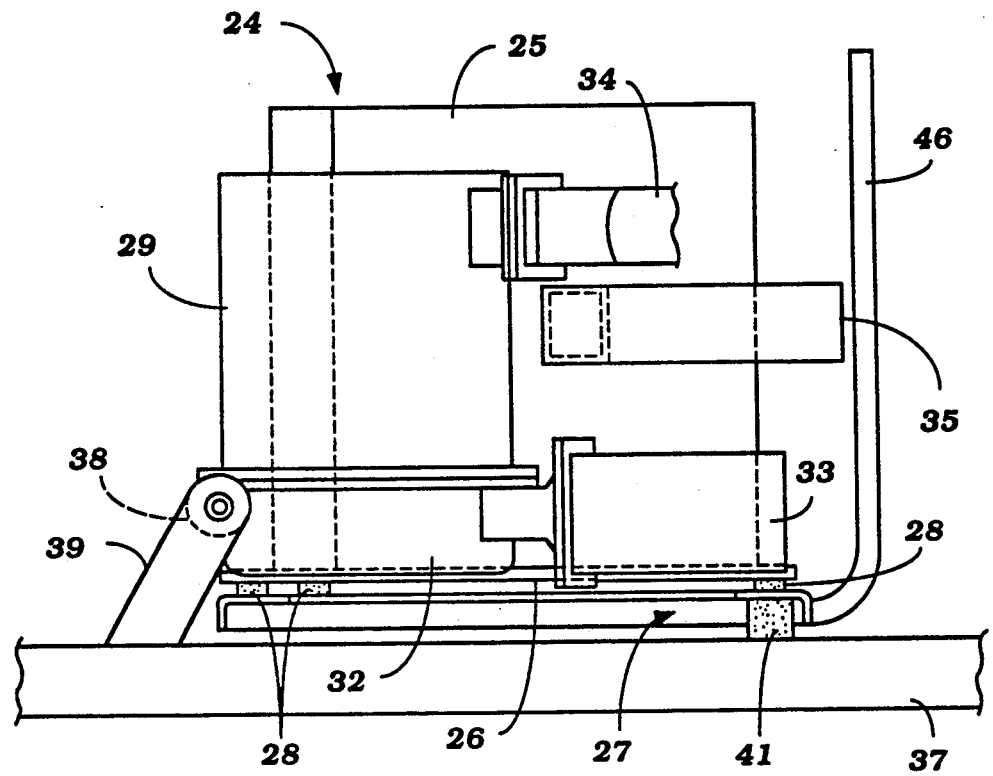
Figure 4
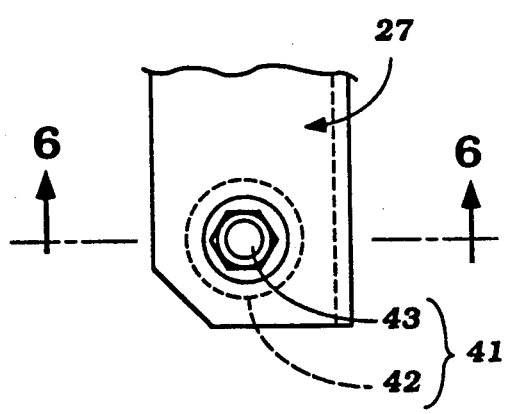
Figure 5
Figure 6

VEHICLE WITH FUEL CELL SYSTEM

BACKGROUND OF THE INVENTION

This invention relates to a vehicle with a fuel cell system and more particularly to an improved fuel cell powered vehicle.

With the concern for the environment and the dwindling sources of petroleum based fuels, there has been considerable emphasis on alternative power sources for many applications including vehicles. The fuel cell is one such alternative source which is receiving a considerable amount of attention. However, present vehicles powered by fuel cells have tended toward large vehicles such as buses wherein the fuel cells are located in a relatively exposed position and can be subject to damage.

There is, however, a need for a smaller type of vehicle that can be powered by a fuel cell and in which the fuel cell will be adequately protected. In addition, with such small vehcles, it is desirable to insure that the stability of the vehicle be maintained.

It is, therefore, a principal object of this invention to provide an improved fuel cell powered wheeled vehicle.

It is a further object of this invention to provide a fuel cell powered wheeled vehicle wherein the fuel cell is located in such a manner so as to maintain stability of the vehicle.

It is a further object of this invention to provide a fuel cell powered vehicle wherein the fuel cell is located in an appropriate condition to maintain stability.

It is a further object of this invention to provide a fuel cell powered vehicle wherein the fuel cell is located in such a way that it will be inherently protected from damage.

In connection with the use of fuel cells for powering small vehicles, the placement of the fuel cell presents certain difficulties, as aforenoted. In addition to maintaining good stability for the vehicle, the fuel cell which may be somewhat bulky, should be positioned in such a location that it will not interfere with the useful space of the vehicle.

It is, therefore, a further object of this invention to provide an improved arrangement for a small vehicle powered by a fuel cell wherein the fuel cell will be positioned in an out of the way place and which will not encroach upon the useful space of the vehicle.

As is well known, fuel cells normally employ a number of closely spaced plates, such as plates of carbon composition that coooperate to generate electrical power. However, in addition to the normal vibrations encountered in a vehicle, most vehicles generally are designed so as to operate up and down inclines and also in such a way that the vehicle will be displaced or lean relative to the horizontal. Of course, such motion can adversely affect fuel cells and specifically the plates thereof.

It is, therefore, a still further ofject of this invention to provide a fuel cell powered vehicle wherein the fuel cell is located in such an orientation so as to minimize the likelihood of damage to the fuel cell due to vehicle operation.

SUMMARY OF THE INVENTION

This invention is adapted to be embodied in a fuel cell lowered vehicle that has a body assembly which defines at least one passenger seat, a pair of wheels suspended by the body at one end thereof in transversely spaced apart relation and at least one wheel suspended by the body assembly at the other end thereof. Means are provided for steering at least one of the wheels. A fuel cell is carried by the body assembly and generates electrical power for driving at least one of the wheels.

In accordance with a first feature of the invention, the fuel cell is supported contiguous to the center of gravity of the vehicle.

In accordance with another feature of the invention, the fuel cell is positioned inwardly from the vehicle wheels toward the center when the vehicle is viewed in a horizontal plane so as to protect the fuel cell.

In accordance with another feature of the invention, the fuel cell is positioned beneath the seat of the vehicle so as to not encroach upon the usable space of the vehicle.

In accordance with yet another feature of the invention, the fuel cell is positioned in the vehicle with its plates extending in a horizontal direction so as to minimize the likelihood of damage due to vehicle operation.

BRIEF DESCRIPTION OF THE DRAWINGS

FIG. 4 is a side elevational view of the fuel cell.

FIG. 5 is a further enlarged top plan view of the area encompassed by the circle 5 in FIG. 3.

FIG. 6 is a cross-sectional view taken along the line 6—6 of FIG. 5.

DETAILED DESCRIPTION OF THE PREFERRED EMBODIMENTS

Figure 1:
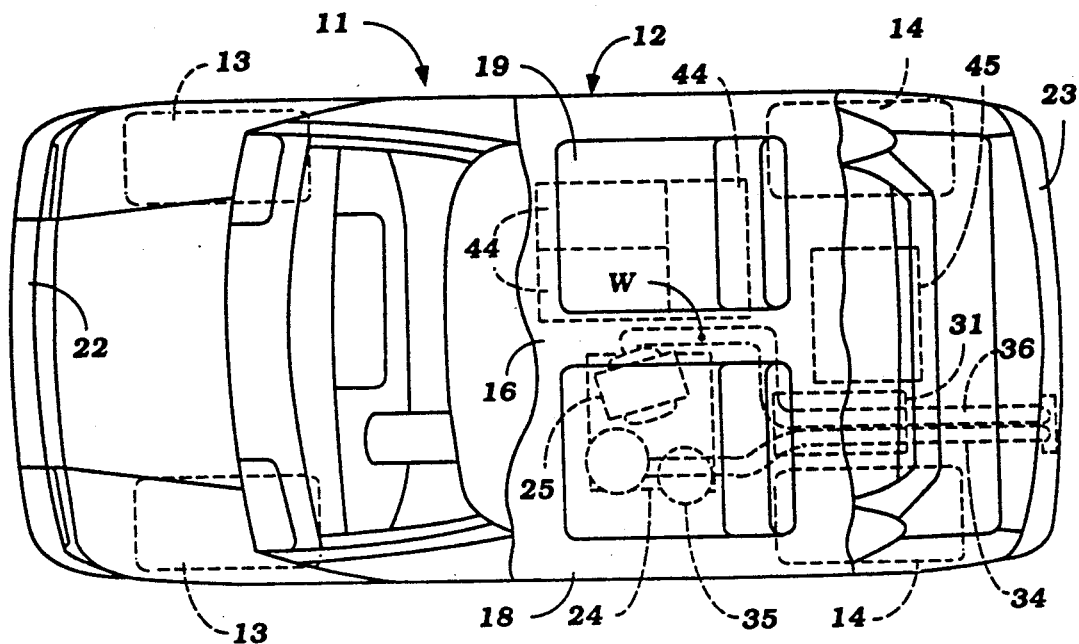
FIG. 1 is a top plan view, with a portion broken away, of a small fuel cell powered vehicle constructed in accordance with an embodiment of the invention.
Figure 2:
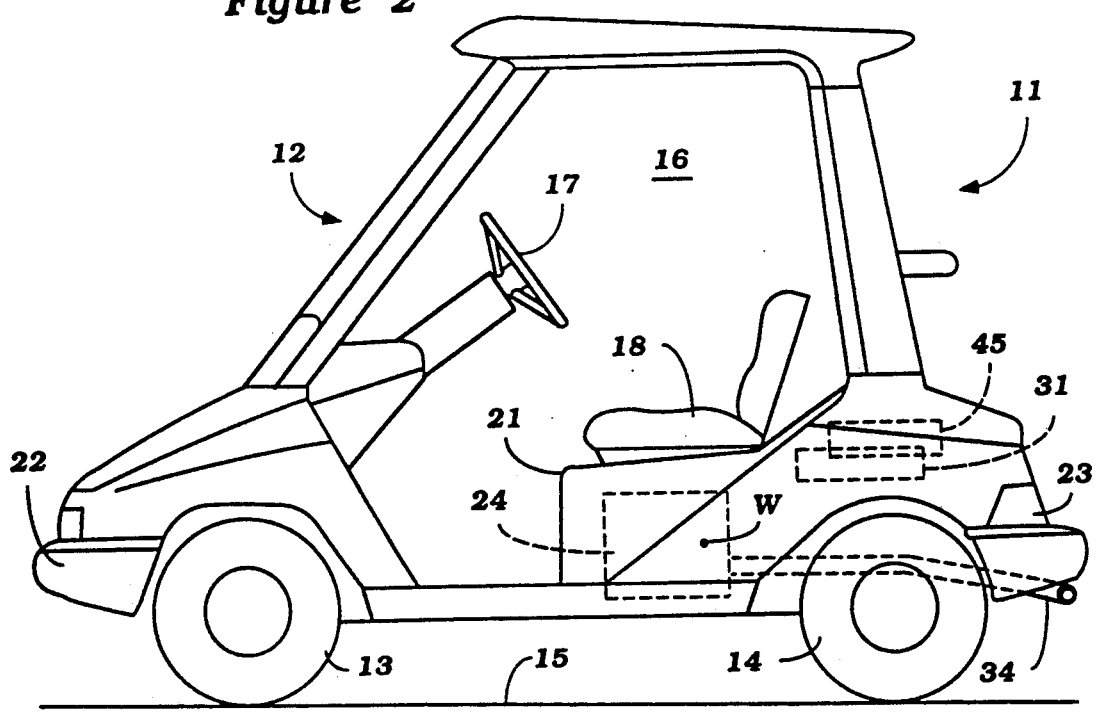
FIG. 2 is a side elevational view thereof.

Referring first to the embodiment of FIGS. 1 through 6 and initially to FIGS. 1 and 2, a small fuel cell powered vehicle constructed in accordance with this embodiment of the invention is identified generally by the reference numeral 11. As will be noted, the vehicle 11 is designed to accommodate a pair of riders and may be, for example, a golf cart. However, the vehicle 11 will, as should be readily apparent to those skilled in the art, permit itself to be employed as a commuter type vehicle in addition to such utilization as a golf cart.

The vehicle 11 includes a body assembly, indicated generally by the reference numeral 12, which may be fabricated in any known manner and which may include a separate or integral frame assembly. A pair of dirigible front wheels 13 are supported at the forward end of the body assembly 12 by means of a suitable suspension and steering mechanism. A pair of rear wheels 14 are journaled at the rear of the body assembly 12, also in an appropriate manner. The rear wheels 14 are driven through a differential by means of an electric motor (not shown). This electric motor may be mounted in any suitable location and conveniently can be located immediately adjacent the axle of the rear wheels 14. The vehicle 11 is adapted to operate along the ground, the line of which is shown at 15, and which may be of any type of terrain including uphill and downhill and inclined sections.

The body assembly 12 defines an internal passenger compartment 16 that has a forwardly mounted steering wheel 17 for steering the front wheels 13 as aforenoted. In addition, other appropriate controls such as speed control and brake are positioned appropriately within the passenger compartment 16. An operator seat 18 and passenger seat 19 are mounted on a raised plateform 21 formed in the passenger compartment 16 to the rear of the steering wheel 17. An operator and passenger may be accommodated on the seats 18 and 19.

For safety purposes, the vehicle is provided with a front bumper 22 and a rear bumper 23 which bumpers may be affixed to the body 12 in a suitable manner including shock absorbing or impact absorbing assemblies.

The vehicle 11 and specifically its driving electric motor is adapted to be powered by a fuel cell assembly, indicated generally by the reference numeral 24, and which is positioned beneath the raised platform 21 and specifically beneath the operator's seat 18. The fuel cell assembly 24 is located so that it will be spaced inwardly from the wheels 13 and 14 toward the center of the vehicle and specifically adjacent its center of gravity W. This will insure good stability for the vehicle as well as protection for the fuel cell assembly 24.

Referring now in detail primarily to FIGS. 3 through 6, the fuel cell assembly 24 includes a fuel cell 25 which may be of any known type but which is disposed in the body assembly 12 so that its internal plates extend in a horizontal direction. Because of this orientation, the fuel cell 25 will be protected against damage due to vibrations and change of grade which effect either up or down movement or leaning to the right or to the left.

Figure 3:
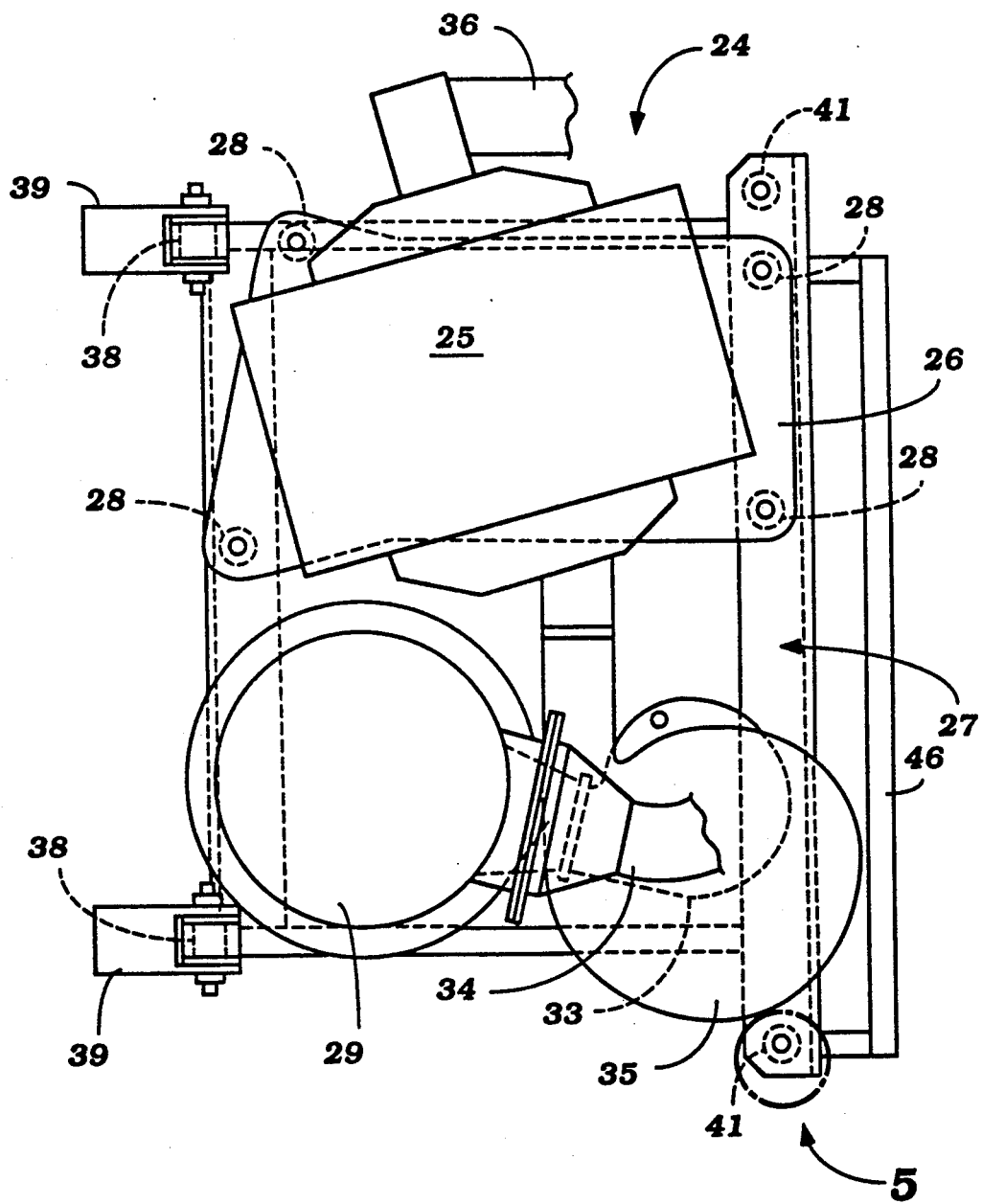
FIG. 3 is an enlarged top plan view showing the fuel cell and the mounting arrangement therefor.

The fuel cell 25 is mounted on a mounting plate 26 in a somewhat inclined direction to the fore and aft longitudinal center line of the vehicle 11 as may be best seen in FIGS. 1 and 3. This mounting plate 26 is, in turn, mounted on a subframe assembly, indicated generally by the reference numeral 27, by means of four spaced elastic isolators 28. The isolators 28 include elastomeric rings which are interposed around threaded fasteners that extend between the mounting plate 26 and the subframe 27. It should be noted that the fuel cell 25 is disposed to one side of the subframe 27.

The fuel cell assembly 24 also includes a reformer 29 which is mounted appropriately on the subframe 27 and which receives fuel to be reformed, such as a mixture of methanol and water from a fuel storage tank 31 that is positioned within the body assembly 11 to the rear of the passenger compartment 16. This fuel is delivered to the reformer 29 in an appropriate manner so as to be converted into a hydrogen rich fuel for the fuel cell 25.

As is well known, the reformer includes a catalyst bed and a lower heater unit or burner 32 which burns the methanol fuel and which receives air from a blower 33 which is also mounted upon the frame assembly 27 in an appropriate manner. The exhaust gases from the reformer 29 are delivered to the atmosphere through an exhaust pipe 34 which exits at the rear of the vehicle 12 in proximity to the rear bumper 23.

Also mounted on the subframe 27 is a blower 35 for forcing air into the fuel cell 25 for its reaction operation. The exhaust gases from the fuel cell 25 are also discharged to the atmosphere through an exhaust pipe 36 that extends rearwardly and which terminates adjacent the rear bumper 23.

The subframe 27 is mounted at its forward end on the floor 37 of the vehicle body assembly 12 by means of a pair of elastic isolators 38 which are attached to the front of the subframe 27 and to a pair of upstanding arms 39 of the body assembly floor pan 37. A pair of similar isolator assemblies 41 and having a construction as shown in FIGS. 5 and 6 are interposed between the rear of the subframe 27 and the floor pan 37. These isolator assemblies 38 and 41 comprise elastomeric rings 42 that have plates bonded to their ends from which studs 43 extend so as to permit the elastic isolator 41 to be attached to the subframe 27 and floor pan 37 in a known manner.

There are times when the fuel cell assembly 24 may not generate adequate electrical power for motivation of the vehicle 11. There are also times when the fuel cell assembly 24 generates excess electric power. Therefore, there are provided a series of batteries 44 that are positioned beneath the raised body portion 21 and specifically beneath the passenger seat 19. These batteries 44 are selectively charged or discharged through a controller assembly 45 so that during times when the fuel cell assembly 24 is generating excess electrical power, the batteries 44 will be charged and during times when insufficient electrical power is being generated, the batteries 44 can supply additional electrical power for the driving motor.

The subframe assembly 27 further includes a reinforcing member 46 that is affixed to the rear end thereof and which extends upwardly so as to protect the rear portion of the fuel cell assembly 24.

Figure 7:
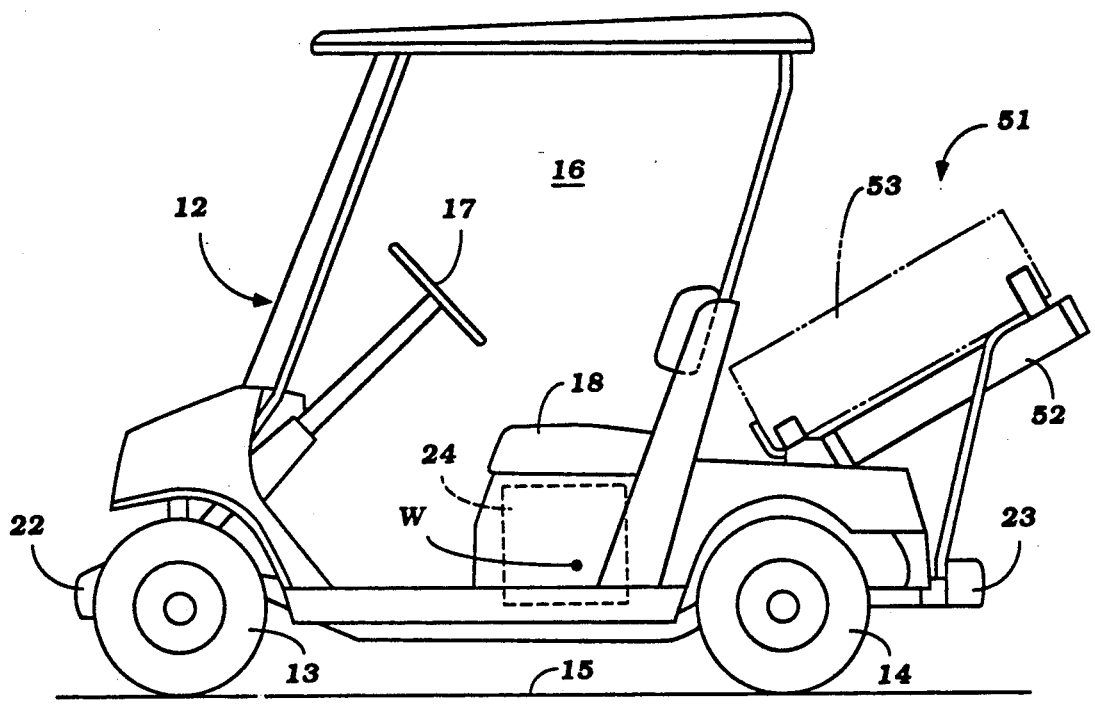
FIG. 7 is a side elevational view, in part similar to FIG. 2, showing another embodiment of the invention.
Figure 8:
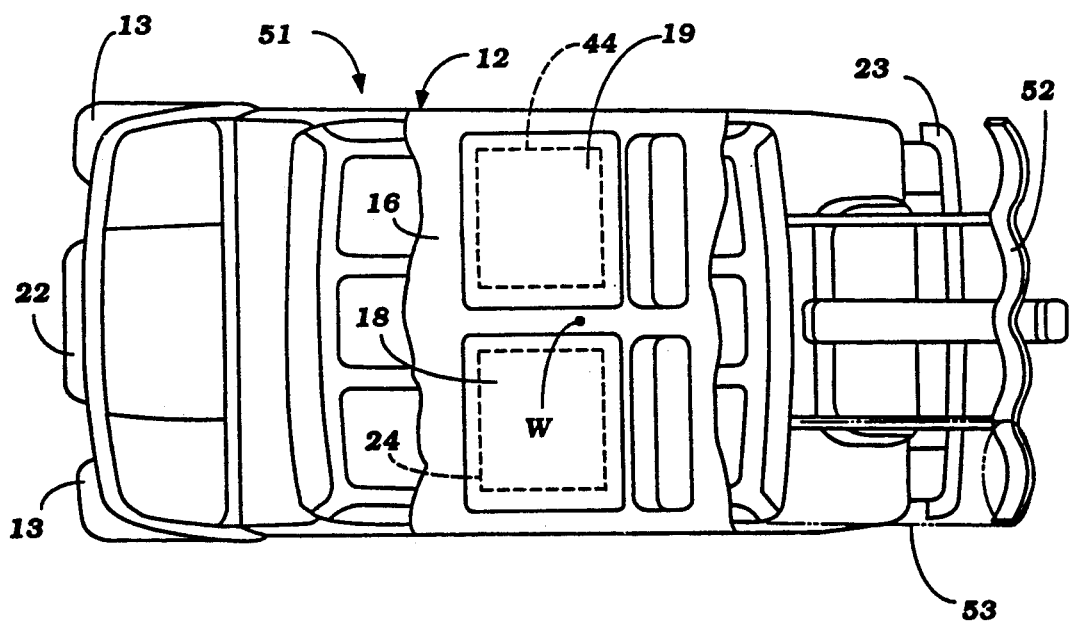
FIG. 8 is a top plan view, in part similar to FIG. 1, with portions broken away, of this embodiment.

In the embodiment of the invention as thus far described, the vehicle 11 has been described as a golf cart or smaller utility vehicle. FIGS. 7 and 8 show a further embodiment of the invention which is generally the same as the embodiment thus far described but which is primarily designed for use as a golf cart. In this embodiment, the vehicle, indicated generaly by the reference numeral 51, has all of the major components the same as the vehicle as thus far described. Where that is the case, these components have been identified by the same reference numeral and further description is believed to be unnecessary.

In connection with this vehicle, the passenger compartment 16 is moved forwardly although the fuel cell assembly 24 is still positioned close to the center of gravity of the vehicle and beneath the driver's seat 18. In this embodiment, the batteries 44 are disposed beneath the passenger seat 19. A golf club rack 52 is carried at the rear of the passenger compartment and is designed to accommodate a plurality of golf bags shown in phantom and identified by the reference numeral 53.

Figure 9:
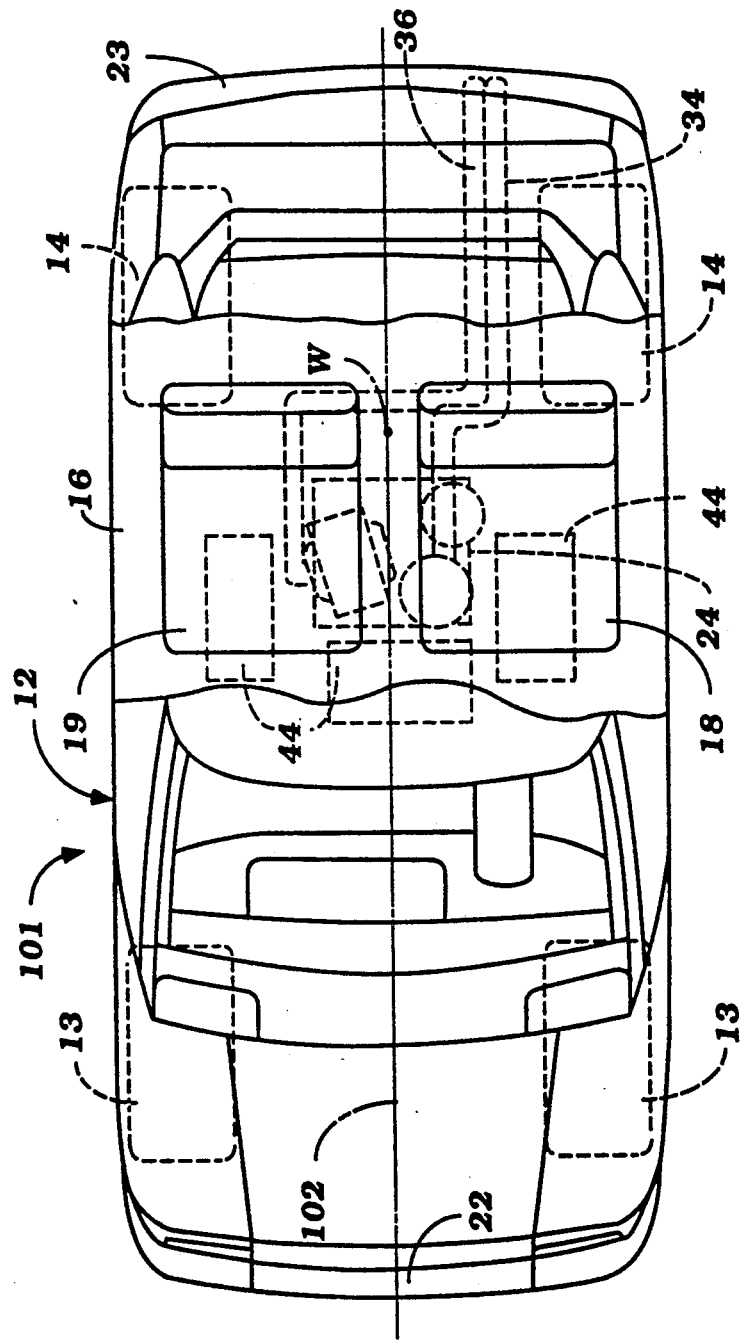
FIG. 9 is a top plan view, in part similar to FIGS. 1 and 8, with a portion broken away, showing yet another embodiment of the invention.

FIG. 9 shows another embodiment of the invention which is basically the same as the embodiment of FIGS. 1 through 6. For that reason, components of the vehicle which are the same have been identified by the same reference numeral. In this embodiment, however, the vehicle, indicated generally by the reference numeral 101, is laid out in its passenger compartment so that the fuel cell assembly 24 lies along a longitudinal center line 102 of the vehicle and hence is positioned between the driver's seat 18 and passenger seat 19 rather than under the driver's seat 18 as in the previously described embodiment. However, it is to be understood that the invention can be utilized in conjunction with vehicles have bench type seats and then the fuel cell assembly 24 would be positioned under this seat. Because of this location for the fuel cell assembly 24, which is still closely adjacent the center of gravity W as well as being on the longitudinal center line 102. Because of this positioning, the storage batteries 44 are nested around the fuel cell assembly 24 rather than on one side of it. In all other regards, this embodiment is the same as the embodiment of FIGS. 1 through 6.

It should be readily apparent from the foregoing description that the described embodiments provide very compact vehicles powered by fuel cell assemblies and in which the fuel cells are disposed closely adjacent the center of gravity of the vehicle and inwardly of the wheels to be protected. In addition, the fuel cell is disposed so that its plates extend longitudinally in horizontal planes so as to avoid damage. In this regard, the invention has been described in conjunction with arrangements with a single fuel cell 24. It is to be understood, however, that the invention can be utilized in conjunction with multiple fuel cells, one stacked upon the other in a vertical orientation. Of course, other orientations can be utilized so long as the aforenoted principles are employed.

In addition to those embodiments illustrated and described, which are the preferred embodiments, various changes and modifications may be made without departing from the spirit and scope of the invention, as defined by the appended claims.

We claim:

1. A fuel cell powered wheeled vehicle having a body assembly defining at least one passenger seat, a pair of wheels suspended by said body at one end thereof in transversely spaced apart relation, a wheel suspended by said body at the other end thereof, means for steering at least one of said wheels, an electric motor for driving at least one of said wheels, a fuel cell system comprising a fuel cell for generating electrical power for said electric motor for driving said at least one of said wheels and a reformer for supplying fuel to said fuel cell, said fuel cell being resiliently supported contiguous to the center of gravity of said vehicle system including said fuel cell and said reformer, said fuel cell system being positioned transversely between the pair of wheels and longitudinally between the pair of wheels and the wheel suspended by the body at the other end thereof for protection of said fuel cell system upon front and side impacts of said vehicle.

2. A fuel cell as set forth in claim 1 further including a storage battery positioned adjacent the fuel cell system for being charged by the fuel cell and offering auxiliary power for powering said electrical motor.

3. A fuel cell as set forth in claim 2 wherein the fuel cell system is disposed beneath the seat.

4. A fuel as set forth in claim 3 wherein the battery is positioned beneath the seat.

5. A fuel cell as set forth in claim 4 wherein the battery is positioned beneath a passenger seat separate from the first mentioned seat.

6. A fuel cell as set forth in claim 1 wherein the fuel cell is disposed with its plates extending horizontally in a longitudinal direction relative to the longitudinal axis of the vehicle.

7. A fuel cell as set forth in claim 1 wherein there are a pair of transversely spaced apart wheels at the other end of the vehicle and said wheels comprise the steered wheels, the pair of wheels comprising powered wheels driven by the electric motor receiving electricity from the fuel cell.

8. A fuel cell powered wheeled vehicle having a body assembly defining at least one passenger seat, a pair of wheels suspended by said body at one end thereof in transversely spaced apart relation, at least one wheel suspended by said body at the other end thereof, means for steering at least one of said wheel, an electric motor for driving at least one of said wheels and a fuel cell for generating electrical power for driving said electric motor and said at least one of said wheels, said fuel cell being positioned inwardly from said wheels toward the center of said vehicle when viewing said vehicle in a horizontal plane for protection of said fuel cell by said wheels, said fuel cell being suspended resiliently within said vehicle and being disposed so that its plates extend in a horizontal direction.

9. A fuel cell as set forth in claim 8 wherein the fuel cell is part of a fuel cell system including the fuel cell, and a reformer for reforming fuel for said fuel cell and wherein the reformer is also resiliently suspended by the vehicle.

10. A fuel cell as set forth in claim 9 wherein the fuel cell system is disposed beneath the seat.

11. A fuel cell as set forth in claim 8 further including a storage battery positioned adjacent the fuel cell system for being charged by the fuel cell and offering auxiliary power for powering said vehicle.

12. A fuel cell as set forth in claim 11 wherein the fuel cell system is disposed beneath the seat.

13. A fuel cell as set forth in claim 12 wherein the battery is positioned beneath the seat.

* * * * *